United States Patent [19]
Geist

[11] Patent Number: 5,392,212
[45] Date of Patent: Feb. 21, 1995

[54] APPARATUS FOR IDENTIFYING UNKNOWN WORDS BY COMPARISON TO KNOWN WORDS

[75] Inventor: Jon C. Geist, Olney, Md.

[73] Assignee: The United States of America as represented by the Secretary of Commerce, Washington, D.C.

[21] Appl. No.: 86,982

[22] Filed: Jul. 7, 1993

[51] Int. Cl.[6] .................................... G06F 15/21
[52] U.S. Cl. ..................... 364/419.11; 364/419.1; 364/419.12; 364/419.13; 364/419.14; 392/40
[58] Field of Search ............... 364/419.11, 419.12, 364/419.13, 419.14, 419.1; 382/40

[56] References Cited

U.S. PATENT DOCUMENTS

| | | | |
|---|---|---|---|
| 4,328,561 | 5/1982 | Convis et al. | 364/419.12 |
| 4,355,371 | 10/1982 | Convis et al. | 364/419.12 |
| 4,471,459 | 9/1984 | Dickinson et al. | 364/419.12 |
| 4,654,875 | 3/1987 | Srihari et al. | 382/40 |
| 4,730,269 | 3/1988 | Kucera | 364/419.12 |
| 4,783,758 | 11/1988 | Kucera | 364/419.12 |
| 4,783,761 | 11/1988 | Gray et al. | 364/419.2 |
| 4,799,271 | 1/1989 | Nagasawa et al. | 382/40 |
| 4,896,133 | 1/1990 | Methvin et al. | 340/146.2 |
| 4,903,206 | 2/1990 | Itoh et al. | 364/419.12 |
| 4,907,900 | 3/1990 | Duncan IV | 400/63 |
| 4,979,227 | 12/1990 | Mittelbach et al. | 382/40 |
| 4,991,135 | 2/1991 | Yoshimura et al. | 364/419.13 |
| 5,073,864 | 12/1991 | Methvin et al. | 364/715.11 |

OTHER PUBLICATIONS

"Use of Spelling-To-Sound Rules in Reading" Wolf et al. 1976, Abstract.

*Primary Examiner*—Gail O. Hayes
*Assistant Examiner*—Gita D. Shingala
*Attorney, Agent, or Firm*—Leydig, Voit & Mayer

[57] ABSTRACT

An apparatus for correlating an unknown word with a plurality of dictionary words includes a first memory area storing data corresponding to the unknown word and a plurality of second memory areas respectively storing data corresponding to the plurality of dictionary words. A control mechanism coupled to the first and second memory areas divides the unknown word into a plurality of unknown word fragments and divides each of the plurality of dictionary words stored in the second memory areas into a plurality of dictionary word fragments. An arithmetic logic unit compares the unknown word fragments to the dictionary word fragments and generates an output signal indicating a hit when an unknown word fragment corresponds to at least one of the dictionary word fragments. A hit counter counts the number of hits. The first memory area and the plurality of second memory areas may be implemented using circular shift registers.

9 Claims, 5 Drawing Sheets

APPARATUS FOR IDENTIFYING UNKNOWN WORDS BY COMPARISON TO KNOWN WORDS

TECHNICAL FIELD

The present invention relates to an apparatus and method for parallel character string analysis using digital circuitry and, more particularly, for correlating a digraph corresponding to an unknown word or phrase stored in a first memory array with a plurality of digraphs corresponding to known dictionary words or phrases respectively stored in a plurality of second memory arrays.

BACKGROUND ART

Many forms, such as census forms, require an individual to answer questions by hand printing a response on the form. Most responses include words that are chosen from a list that is either implicitly or explicitly defined for the person filling out the form. For example, an implicitly defined list includes the list of Indian tribes that appears on a United State Government census form. An explicitly defined list includes, for example, lists of various diseases that are stated on an insurance application form.

Traditionally, the response is entered into a computer manually using a keyboard. Optical character recognition (OCR) systems automatically convert these hand-printed responses into a computer-readable format. Identifying hand-printed words read by the OCR systems may be difficult because there may be a number of spelling errors in the words. Spelling errors include errors made by the persons filling out the forms (e.g., insertion, deletion, substitution, and transposition of letters), as well as the character recognition errors of the OCR system (e.g., letter substitution and segmentation errors). At the present time, most errors in using state of the art OCR techniques are attributable to OCR recognition errors and not human errors in hand-printed responses.

For each application of the OCR techniques, there is a maximum tolerable error rate corresponding to the number of words which are either unidentifiable or incorrectly identified. If this maximum tolerable error rate is exceeded, then OCR cannot replace manual keyboard entry. Currently, state of the art OCR techniques have an error rate which is too high for most applications. Thus, there is a need to develop better OCR methods or to develop word identification methods that are more tolerant of the various types of errors encountered in the OCR of hand-written forms.

Several methods for identifying words in OCR of hand-written forms are disclosed in U.S. patent application Ser. No. 07/911,698, now U.S. Pat. No. 5,329,598, filed Jul. 10, for "METHOD AND APPARATUS FOR ANALYZING CHARACTER STRINGS", incorporated herein by reference. This patent application discloses a general purpose parallel computer for implementing methods for analyzing character strings. However, there is still a need for a simple, low cost architecture that is optimized for a particular character string analysis method.

SUMMARY OF THE INVENTION

The principal object of the present invention is to provide a simple and economical apparatus for implementing character string analysis methods.

A further object of the invention is to provide an optimized apparatus for a particular character string analysis method.

A correlating apparatus according to the invention, includes a first memory area storing data corresponding to a unknown word and a plurality of second memory areas respectively storing data corresponding to one of a plurality of dictionary words. A control mechanism coupled to the first and second memory areas divides the unknown word into a plurality of unknown word fragments and divides each of the dictionary words stored in the second memory areas into a plurality of dictionary word fragments. An arithmetic logic unit compares the unknown word fragments to the dictionary word fragments and generates an output signal indicating a hit when an unknown word fragment corresponds to at least one of the dictionary word fragments. A hit counter counts the number of hits.

DETAILED DESCRIPTION OF PREFERRED EMBODIMENTS

Figure 1:
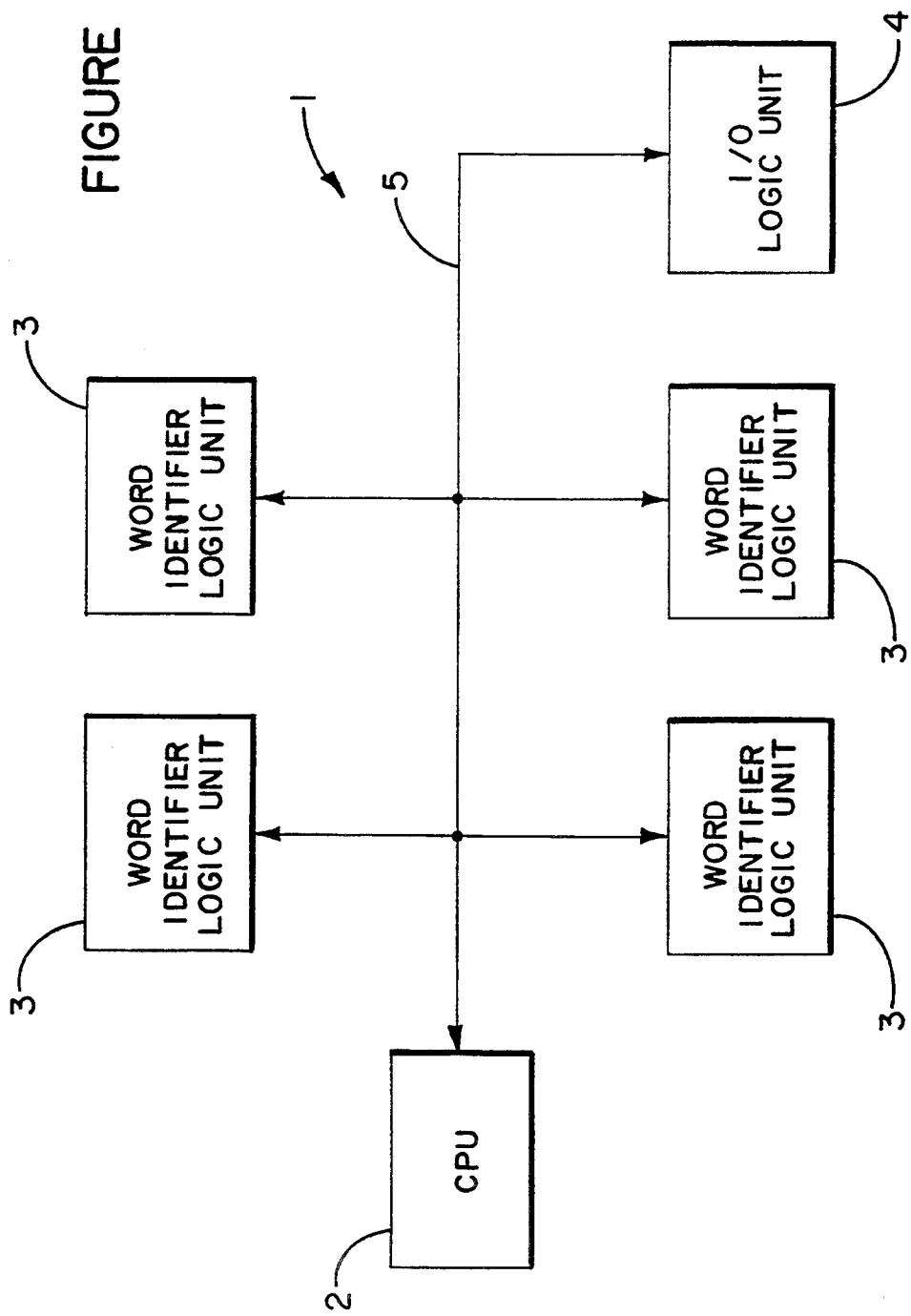
FIG. 1 is a block diagram of an apparatus for correlating words and phrases according to an embodiment of the invention.

An embodiment of a correlating apparatus 1 for correlating words or phrases is shown in FIG. 1. The correlating apparatus 1 includes a CPU 2 connected to a plurality of word identifier logic units 3 and to an input-/output (I/O) logic unit 4 through a system bus 5.

The correlating apparatus 1 may be single integrated circuit chip or may be a plurality of integrated circuit chips located on the same or separate circuit boards. Only a single word identifier logic unit 3 is required for the operation of the invention. The CPU 2 may be, for example, a separate general purpose computer, a microprocessor, or a digital control logic unit. The I/O logic unit 4 may be coupled to another computer system, a scanner, or another input-output device.

Figure 2:
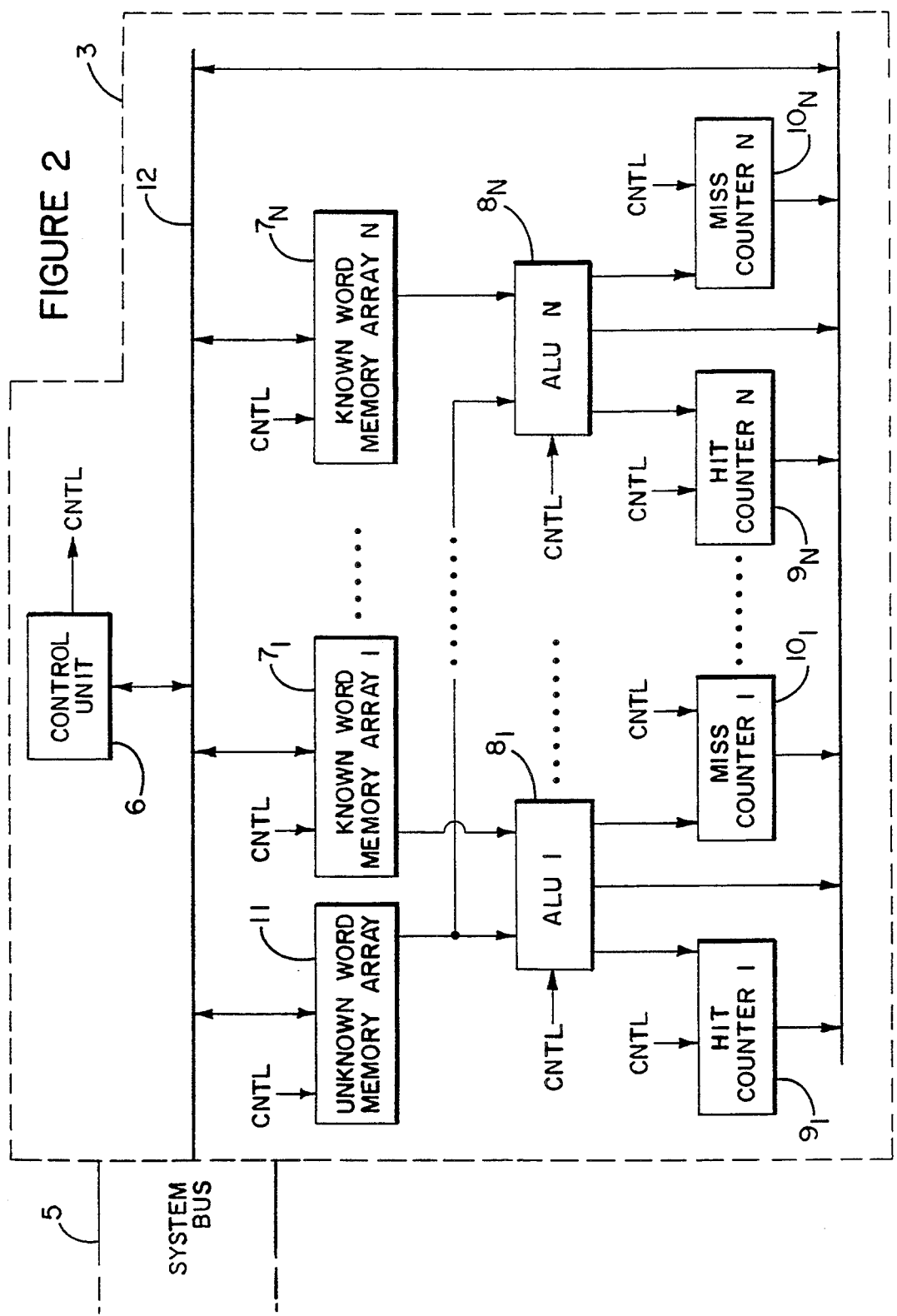
FIG. 2 is a block diagram of an embodiment of the word identifier logic unit shown in FIG. 1.

Referring to FIG. 2, an embodiment of the word identifier logic unit 3 includes an internal bus 12 coupled to a control unit 6, an unknown word memory array 11, N known word memory arrays $7_1$–$7_N$, where N is an integer equal to at least 2, N arithmetic logic units (ALU) $8_1$–$8_N$, N hit counters $9_1$–$9_N$, and N miss counters $10_1$–$10_N$. The internal bus 12 transmits and receives data and controls information flow from and to the system bus 5. The source of information on the system bus 5 is not limited to the structure shown in FIG. 1. The control unit 6 is coupled to the memory arrays $7_1$–$7_N$, 11, the ALUs $8_1$–$8_N$, the hit counters $9_1$–$9_N$, and the miss counters $10_1$–$10_N$.

The unknown word memory array 11 is coupled to each of N ALUs, ALU $8_1$-ALU $8_N$ to $ALU_N$. The known word memory array $7_1$ is coupled to the ALU $8_1$, the known word memory array $7_2$ is coupled to ALU $8_2$, . . . and the known word memory array $7_N$ is coupled to ALU $8_N$. The number of memory arrays employed can vary depending on the particular use of the invention.

A known word may, for example, correspond to a word in an electronically stored dictionary containing a list of recognizable words expected in response to a particular question on a form. All of the known word memory arrays may be loaded in parallel in a single operation. Parallel loading decreases the time required to initialize the known word memory arrays. Alternatively, known word memory arrays may be loaded serially. The number of known words contained in the dictionary may range, for example, between 100 and 100,000 words. Each of the known word memory arrays $7_1-7_N$ preferably contains one or more of the words from the list of dictionary words. Each known word memory 7 contains a plurality of bits, for example, between 10 and 1,000 bits. In a preferred embodiment, each of the known word memory arrays $7_1-7_N$ contains one known dictionary word or phrase. The known word memory arrays may include a random access memory (RAM), a read only memory (ROM), an electrically erasable programmable read only memory (EEPROM), or other types of memories for storing data electronically.

An unknown word may, for example, correspond to a series of characters produced by OCR software. The unknown word memory array 11 may contain one or more unknown words, for example a phrase. In a preferred embodiment, the unknown word memory array 11 contains one unknown word. The unknown word contains a plurality of bits, for example, between 10 and 1,000 bits. The unknown word memory array 11 preferably contains the same number of bits as contained in each of the known word memory arrays $7_1-7_N$. The unknown word memory array 11 is preferably a readable/writable memory.

Unknown words and control information are preferably received from the system bus 5. A plurality of bit patterns corresponding to known dictionary words may be received from the system bus 5 and stored in the known word memory arrays $7_1-7_N$. If the known words are received from the system bus 5, in a preferred embodiment, updating of the known words is only performed when changing dictionaries or when power is first applied to the correlating apparatus 1, each time the apparatus is powered up. Alternatively, the known word memory arrays $7_1-7_N$ may be preprogrammed with a plurality of bit patterns corresponding to known dictionary words.

In operation, the structures FIGS. 1 and 2 is are capable of implementing the methods disclosed in U.S. patent application Ser. No, 07/911,698, filed Jul. 10, 1992, for "METHOD AND APPARATUS FOR ANALYZING CHARACTER STRINGS" in a highly efficient manner using serial/parallel operations. By way of illustration and not limitation, the operation of the structures of FIGS. 1 and 2 will be discussed with regard to a single example of operation.

An unknown word received from the system bus 5 is stored in the unknown word memory array 11. As discussed above, a plurality of known words has been previously stored in the known word memory arrays $77_1-7_N$. Each of the known words in the known word memory arrays $7_1-7_N$ is compared to the unknown word in the unknown memory array 11 through one or more of the ALUs $8_1-8_N$. The comparison may include such logical operations as OR, NAND, addition, subtraction, inversion, etc. The results of the comparison are stored in one of the hit counters $9_1-9_N$ or one of the miss counters $10_1-10_N$. Alternatively, the results of the comparison may be directly output to the internal bus 12. In a preferred embodiment, the comparison includes logical AND and XOR functions.

When comparing the contents of a first memory array with the contents of a second memory array, in an AND comparison, a "hit" occurs whenever both the first and second memory arrays contain a logic "1" at identical bit address locations within each memory array. A "hit count" is defined as the number of hits that occur when the contents of the first memory array are compared with the contents of the a second memory array. The logic "1" bits produced as a result of the logic AND comparison are indicative of the number of hits or agreements that occurred in the comparison. One of the hit counters $9_1-9_N$ counts the number of hits (hit count) that occur as a result of a particular comparison. When comparing a first memory array with a second memory array in a logical XOR operation, a "miss" occurs whenever the first and second memory arrays contain opposite logic values (i.e., logic "0" and "1") for an identical bit address location within each memory array. A "miss count" is defined as the number of misses that occur when the contents of a first memory array are compared to the contents of a second memory array.

A logical XOR of one of the plurality of known word memory arrays $7_1-7_N$ with the unknown word memory array 11 produces a logic "1" bit, in this case a miss, whenever identical bit address locations within each of the memory arrays contain opposite logic levels (i.e., logic "1" and logic "0"). The logic "1" bits produced as a result of the logic XOR comparison are indicative of the number of misses that occurred in the comparison. The corresponding miss counters $10_1-10_N$ counts the number of misses (miss count) that occur for the respective known word memory arrays $7_1-7_N$.

The control logic unit 6 may be utilized to output data stored in each hit counter $9_1-9_N$ and miss counter $10_1-10_N$ in response to address signals on the system bus 5. Alternatively, the control logic unit 6 may make calculations from the results output from the counters $9_1-9_N$, $10_1-10_N$ to determine which known word has the greatest likelihood of corresponding to the unknown word. By performing this calculation internally, only a subset of values, corresponding to those known words having a high level of confidence, are output from the word identifier logic unit 3. A preferred calculation method for determining a confidence factor is:

$$\text{CONFIDENCE FACTOR} = 1 - \left(\frac{\text{MISSES}}{\text{HITS}}\right).$$

It may be preferable to incorporate a plurality of word identifier logic units 3 into the correlating apparatus 1. In this manner, a single dictionary of known words may be divided among a plurality of word identifier logic units 3. Alternatively, a different word identifier logic unit 3 may be programmed with a different dictionary corresponding to each question on a form. Thus, the structure of in FIGS. 1 and 2 enables processing of unknown words at a rate that is independent of the number of known words in the dictionary and independent of the number of questions on a form under consideration.

The particular implementation of the word identifier logic unit 3 may vary depending on a particular application. For applications that require a high speed and have a relatively limited number of known dictionary words, it may be preferable to include the entire correlating apparatus on a single semiconductor chip. It is well known in the art that calculations on a single semiconductor substrate can occur at a higher rate than calculations carried out over a plurality of semiconductor substrates.

Figure 3:
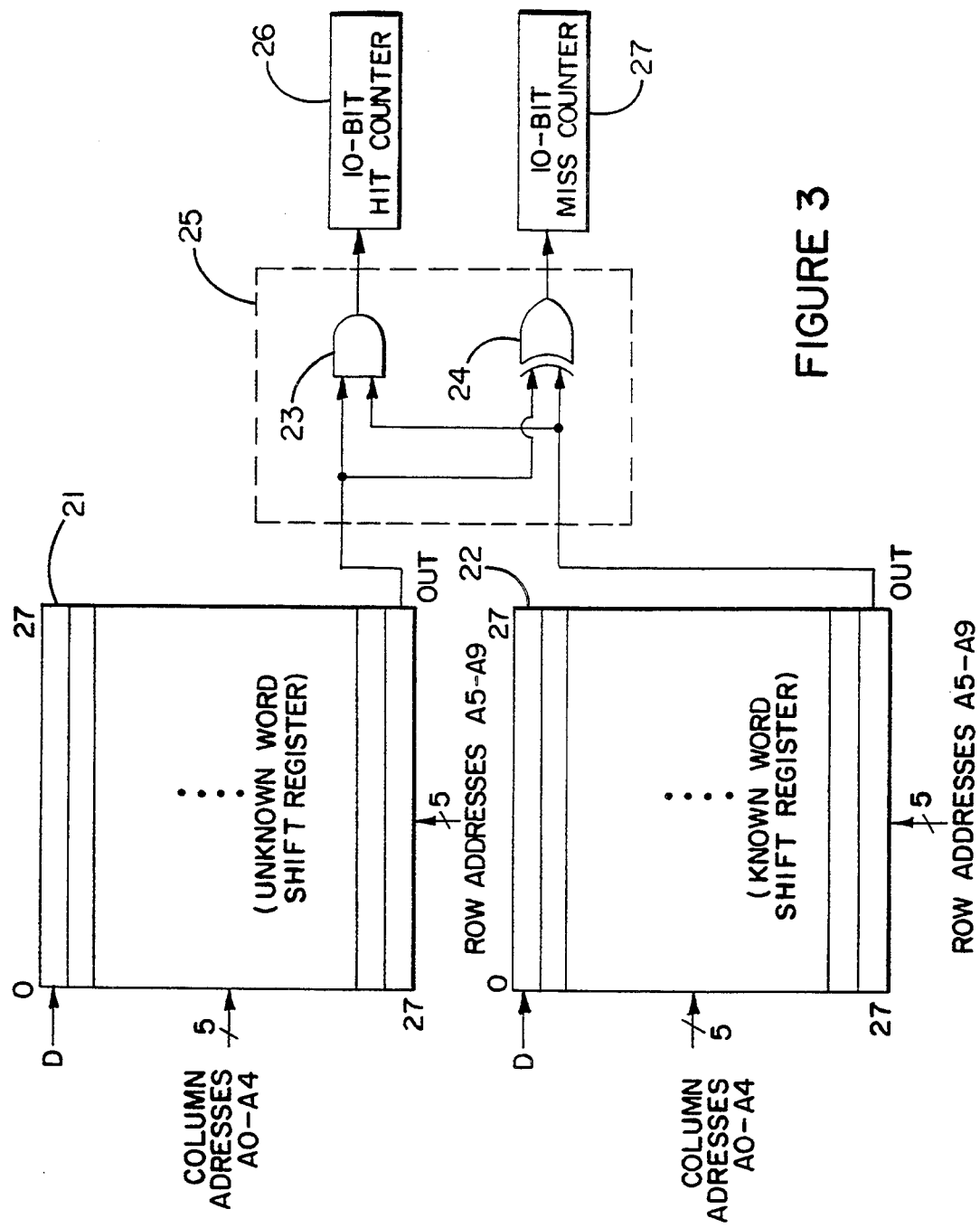
FIGS. 3 is a simplified diagram of another embodiment of the word identifier logic unit shown in FIG. 1.

FIG. 3 is a simplified diagram of another embodiment of the word identifier logic unit 3. An unknown word shift register 21 preferably includes a 784 bit shift register having addresses (A0–A9), and separate data input (D) and a data output (OUT) path. Similarly, a known word shift register 22 preferably includes a 784 bit shift register having address signals (A0–A9), a data input signal (D), and a data output signal (OUT) path. Although the known word shift register 21 and the unknown word shift register 22 are preferably 784 bits in length, other suitable bit lengths may also be utilized. The shift registers 21 and 22 may be operated in either a random access mode or a shift register mode.

When operated in the random access mode, each of the shift registers 21 and 22 may be viewed as a two-dimensional array with address signals A0–A4 accessing address bits within a row (column address) and address signals A5–A9 accessing an individual row of address bits (row address). However, the invention is not limited to this configuration. There may be applications where it may be advantageous to construct the shift register as a one-dimensional array. When operated in the random access mode, each bit is randomly writable in response to an appropriate address signal.

When operated in the shift register mode, each of the shift registers 21 and 22 may connect the output of a bit in Row N, column M-1, with the input of a bit in Row N, column M. The output of a bit in the last column address of row N-1 is preferably connected to the input of a bit in the first column address of row N. The output of a bit in the last column address of the last row (row N) may be connected to the input of a bit in the first column address of the first row (row 1). Thus, when operated in the shift register mode, the shift registers 21 and 22 operate as conventional 784 bit circular shift registers.

The outputs (OUT) from the unknown word shift register 21 and from the known word shift register 22 are input into two inputs of a hit AND gate 23. Similarly, the outputs (OUT) from the unknown word shift register 21 and the known word shift register 22 are input into two inputs of a miss XOR gate 24. In the embodiment of the invention illustrated in FIG. 3, an arithmetic logic unit 25 comprises the AND gate 23 and the XOR gate 24. A 10 bit hit counter 26 is coupled to the output of the AND gate 23, and a 10-bit miss counter 27 is coupled to the output of the XOR gate 24.

In operation, a bit pattern corresponding to an unknown word is stored in the unknown word shift register 21 and a bit pattern corresponding to a known word is stored in the known word shift register 22 by selecting appropriate addresses (A0–A9). The bit pattern corresponding to the unknown word is shifted out of the unknown word shift register 21 in a serial format. Similarly, a bit pattern corresponding to the known word is simultaneously shifted out of the known word shift register 22 in a serial format. The 10-bit hit counter is incremented each time the shift registers 21 and 22 are shifted one bit and a logic 1 is output from the AND gate 23. The 10-bit miss counter is incremented each time the shift registers 21 and 22 are shifted one bit and a logic 1 is output from the XOR gate 24.

FIG. 3 shows a single known word shift register 22 operating in conjunction with a single unknown word shift register 21. As is apparent from FIG. 2, a single unknown shift register 21 may be used in combination with N known word shift registers $22_1$–$22_N$. Such a configuration is schematically illustrated in FIG. 4.

Figure 4:
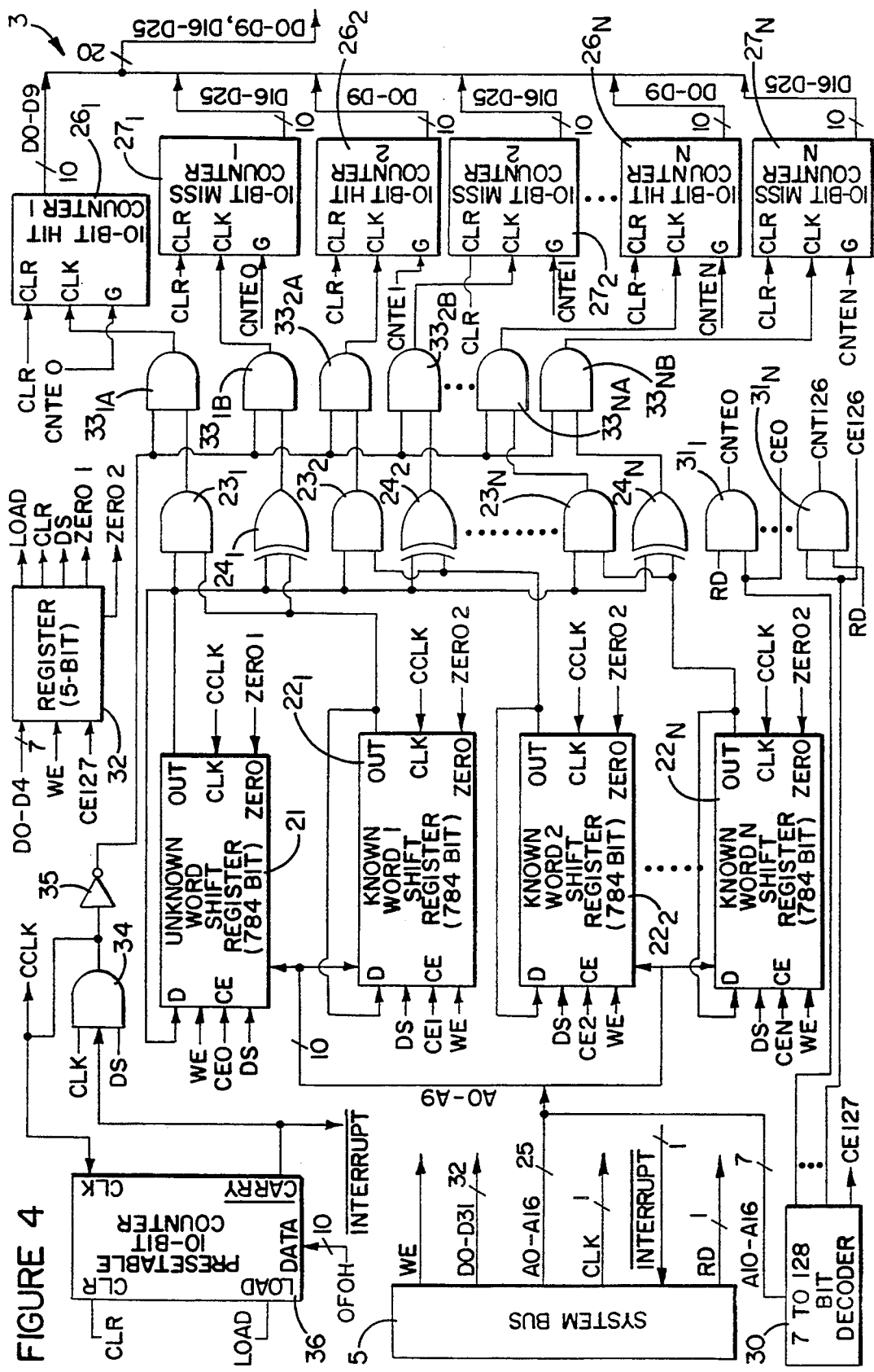
FIGS. 4 is a diagram of the second embodiment of the word identifier logic unit shown in FIG. 3.

FIG. 4 is a detailed diagram of the word identifier logic unit 3 of FIG. 3. A system bus 5 carries various signals including a write enable (We), data signals (D0–D31), address signals (A0–A16), a clock signal (CLK), a read signal (Rd and an interrupt signal (INTERRUPT).

Address signals A10–A16 are input into a 7 to 128 bit decoder 30. The first 127 outputs from the 7 to 128 bit decoder 16 are respectively coupled to corresponding AND gates of a plurality of counter enable AND gates $31_1$–$31_N$ and to respective chip enable inputs, Ce0–CeN, of the shift registers 21 and $22_1$–$22_N$. The read signal Rd is connected to a second input of each of the plurality of counter enable AND gates $31_1$–$31_N$.

The outputs from the counter enable AND gates $31_1$–$31_N$ are connected to an enable input (G) of a corresponding one of 10-bit hit counters $26_1$–$26_N$ and to an enable input (G) of a corresponding one of 10-bit miss counters $27_1$–$27_N$.

When N is less than 127, the 128th output (Ce 127) from the 7 to 128 bit decoder 30 is coupled to a 5-bit register 32. (The invention is not restricted N<127. If an embodiment is constructed on a single semiconductor chip, the available area may limit N to a number that may be greater than or less than 127.) The 5-bit register 32 also receives data signals D0–D4 and the We signal from the system bus 5. The 5-bit register 32 preferably outputs a load signal (LOAD), a clear signal (CLR), a data select signal (DS), a zero 1 signal (ZERO1), and a zero 2 signal (ZERO2).

Address signals A0–A9 are connected to address inputs of each of the shift registers 21 and $22_1$–$22_N$. The output signals (OUT) from each of the shift registers 21 and $22_1$–$22_N$ are coupled to a data input (D) of the same shift register. The output signal OUT from the unknown word shift register 21 is connected to an input of each of a plurality of hit AND gates $23_1$–$23_N$ and to an input of each of a plurality of miss XOR gates $24_1$–$24_N$. Outputs from each of the plurality of known word shift registers $22_1$–$22_N$ are connected to the input of a corresponding one of the plurality of hit AND gates $23_1$–$23_N$ and a corresponding one of the miss XOR gates $24_1$–$24_N$.

The zero 1 signal is connected to the zero input of the unknown word shift register 21. The zero 2 signal is connected to the zero input of each of the known word shift registers $22_1$–$22_N$.

The outputs of the hit AND gates $23_1$–$23_N$ are connected to one of the inputs of a corresponding one of clock AND gates $33_1$–$33_{NA}$. Another input of each of the clock AND gates $33_1$–$33_{NA}$ is connected to the output of a clock enable AND gate 34 through an inverter 35. The outputs of the clock AND gates $33_{1A}$–$33_{NM}$ are connected to corresponding ones of the 10-bit hit counters $26_1$–$26_N$. The outputs of the XOR gates $24_1$–$24_N$ are connected through respective clock AND gates $33_{1B}$–$33_{NB}$ to the corresponding ones of 10-bit miss counters $27_1$–$27_N$. Likewise, the clock enable AND gate 34 output is connected through the inverter 35 to one of the inputs of each of the XOR gates $24_1$–$24_N$.

The clock enable AND gate 34 receives the clock signal CLK from the system bus 5 at a first input, a data select signal DS from the 5-bit register 32 at a second input, and an interrupt signal INTERRUPT from a carry output of a presettable 10-bit counter 36 at a third input. The clock enable AND gate 34 outputs a controlled clock signal CCLK to the input of clock inverter 35, a clock input of the presettable 10-bit counter 36, and clock input of each of the shift registers 21 and $22_1$–$22_N$.

The presettable 10-bit counter 36 has a clear input connected to the clear signal CLR of the 5-bit register 32, a load input connected to the load signal LOAD of the 5-bit register 32, and a 10-bit data port connected to various combinations of logic 0 and logic 1. The interrupt signal INTERRUPT produced by the carry output of the presettable 10-bit counter 36 is also connected to the interrupt signal INTERRUPT of the system bus 5.

Each of the 10-bit hit counters $26_1$–$26_N$ and each of the 10-bit miss counters $27_1$–$27_N$ has a clear input connected to the clear signal CLR from the 5-bit register 32. Each of 10-bit hit counters $26_1$–$26_N$ has a 10-bit data output connected to data signals D0–D9 of the system bus 5. Each of the 10-bit miss counters $27_1$–$27_N$ has a 10-bit data output connected to data signals D16–D25 of the system bus 5.

Figure 5:
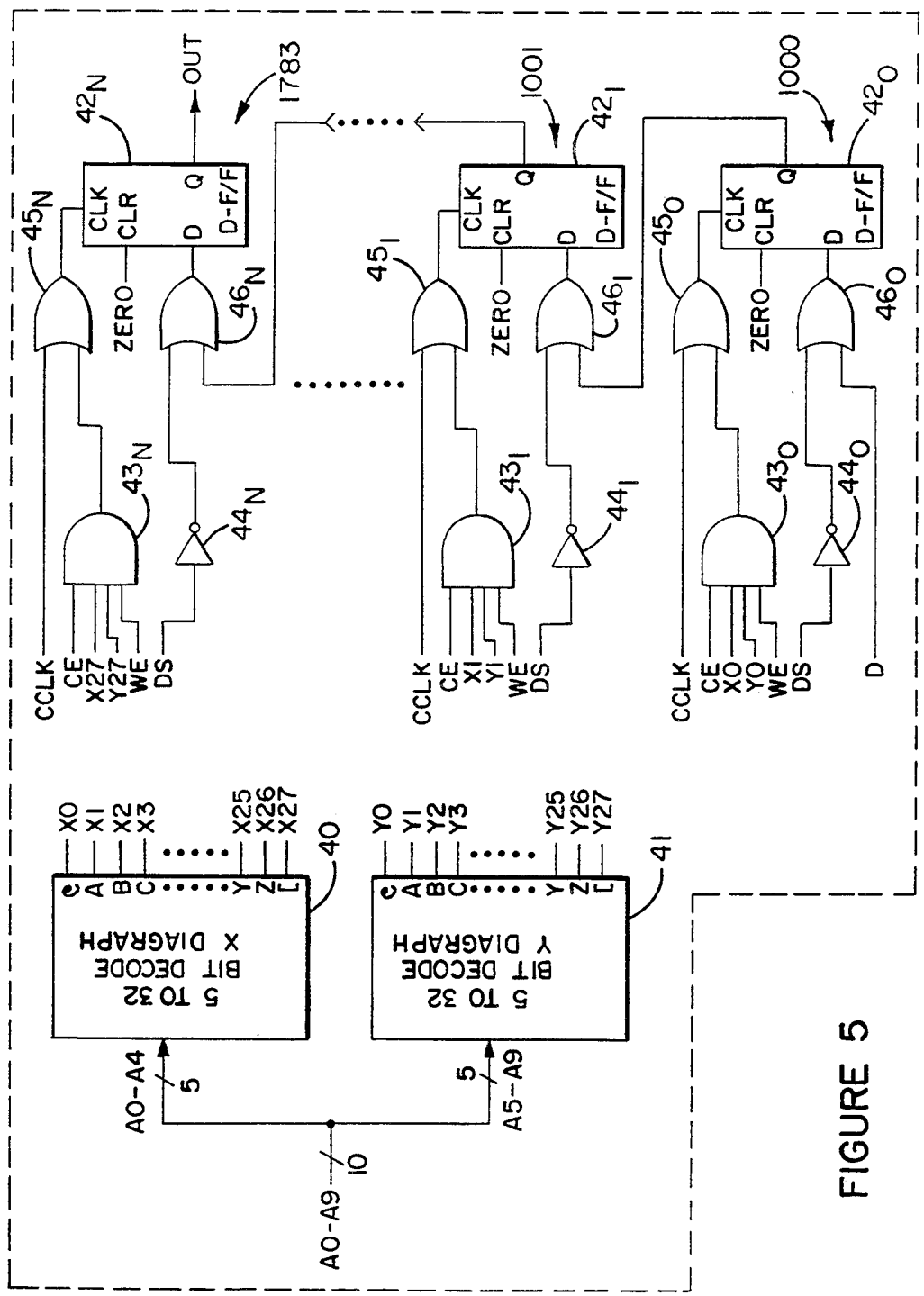
FIG. 5 is a diagram of a shift register shown in FIGS. 3 and 4.

FIG. 5 is a detailed diagram of a preferred embodiment of one of the shift registers 21 and $22_1$–$22_N$ shown in FIGS. 3 and 4. Referring to FIG. 5, addresses signals A0–A4 from the system bus 5 are input into a 5 to 32 bit X-digraph decoder 40, and addresses A5–A9 from the system bus 5 may be input into a 5 to 32 bit Y-digraph decoder 41. The unknown word shift register 21 and the plurality of known word shift register $22_1$–$22_N$ each contain 784 identical memory cells (1000–1783). A first memory cell 1000 may include a D flip/flop $42_O$, a memory cell select AND gate $43_O$, an inverter $44_O$, a clock select OR gate $45_O$, and a data select OR gate $46_O$.

The first memory cell 1000 may include a select AND gate $43_O$ having a first input connected to one of the chip enable output signals Ce0–Ce127 of the 7 to 128 bit decoder 30, a second input connected to the output signal X0 of the 5 to 32 bit X-digraph decoder 40, a third input connected to the output signal Y0 of the 5 to 32 bit Y-digraph decoder 41, and a fourth input connected to the write enable signal We from the system bus 5. The clock select OR gate $45_O$ has a first input connected to the controlled clock signal CCLK and a second input connected to the output of the memory cell select AND gate $43_O$. The clock select OR gate $45_O$ has an output connected to a clock input CLK of the D flip/flop $42_O$. A clear input of D flip/flop $42_O$ is connected to either the zero1 or zero2 signal output from the 5-bit register 32.

The input of the inverter $44_O$ is connected to the data select signal DS of the 5-bit register 32. The data select OR gate $46_O$ has an output connected to a D input of D flip/flop $42_O$. The data select OR gate $46_O$ has a first input connected to the output of inverter $44_O$ and a second input connected to an output Q of the D flip/flop $42_{783}$ in a preceding memory cell. As discussed above with reference to FIG. 4, the data input D of each of the plurality of shift registers 21 and $22_1$–$22_N$ is respectively connected to the data output OUT of the same shift register. Thus, in FIG. 5, the data output OUT from the Nth memory cell 1783 is connected to the data input D of the first memory cell 1000, thereby forming a circular shift register. As discussed above with reference to FIG. 3, the output of each memory cell within the circular shift register is connected to the input of the next memory cell.

The second memory cell 1001 of FIG. 5 is constructed in a similar fashion as the first memory cell 1000. The second memory cell 1001 differs from the first memory cell 1000 in that the second input of data select OR gate $46_1$ of the second memory cell 1001 is connected to an output Q of the D flip/flop $42_O$ of the first memory cell 1000. Additionally, a different 5-bit X-digraph decode signal is input into the first input of AND gate $43_1$. Memory cells 1002 through 1783 are similarly constructed with the exception that each memory cell receives a different X-Y digraph input combination.

In operation, the embodiment of the word identifier logic 3 of FIGS. 3–5 performs a similar correlation function as the embodiment of FIGS. 1 and 2. The invention is not limited to the particular embodiment of FIG. 1 for supplying the appropriate address and control signals across the system bus 5 or to the particular configuration of the control circuitry disclosed in FIGS. 4 and 5.

The CPU 2 of FIG. 1 supplies various control, data, and address signals to the word identifier logic unit 3 shown in FIG. 4. For example, the CPU 2 can store information into the 5-bit register 32 by outputting a logical address of 1111111 in binary code on address lines A10–A16 in conjunction with a write signal We. Data appearing on data lines D0–D4 are then stored in respective memory bits of the 5-bit register 32 (ZERO2, ZERO1, DS, CLR, LOAD). Storing a logic 0 in bit location 0 causes the zero 2 signal ZERO2 to be at a logic 0 level. Storing a logic 1 in bit location 0 causes the zero 2 signal, ZERO2, to be at a logic 1 level. The other bits in the 5-bit register operate similarly. For example, storing a logic 0 in bit location 5 causes the load signal LOAD to be at a logic 0 level. Storing a logic 1 in bit location 5 causes the load signal LOAD to be at a logic 1 level. The actual bit length of the 5-bit register 32 is unimportant. It may be convenient to implement this register with a bit length greater than 5 bits leaving the remaining bits unused.

The zero 2 signal ZERO2 is connected to a clear input of each of the D flip/flops $42_O$–$42_{783}$ of the plurality of known word shift registers $22_1$–$22_N$. When the zero 2 signal ZERO2 is brought to a logic 1 level, all of the known word shift registers $22_1$–$22_N$ are cleared (i.e., a logic 0 level is stored into all memory cells 1000 through 1783 of each known word shift register $22_1$–$22_N$). When the zero 2 signal ZERO2 is brought to a logic 0 level, the functioning of the D flip/flops $42_O$–$42_{783}$ are not affected.

The zero 1 signal ZERO1 is connected to a clear input of each of the D flip/flops $42_O$–$42_{783}$ of the unknown word shift register 21. When the zero 1 signal ZERO1 is brought to a logic 1 level, the unknown word shift register 21 is cleared (i.e., a logic 0 level is stored into all memory cells 1000 through 1783 of the unknown word shift register 21. When the zero 1 signal ZERO1 is brought to a logic 0 level, the functioning of the D flip/flops $42_O$–$42_{783}$ is not affected.

As shown in FIG. 4, the clear signal CLR of the 5-bit register 32 is connected to a clear input of each of the plurality of 10 bit hit counters $26_1$–$26_N$, each of the plurality of 10-bit miss counters $27_1$–$27_N$, and the presettable 10-bit counter 36. The clear signal CLR clears each of the 10-bit counters 36, $26_1$–$26_N$, and $27_1$–$27_N$. When the clear signal CLR is brought to a logic 1 level, each of the 10-bit counters 36, $26_1$–$26_N$, and $27_1$–$27_N$ is cleared (i.e., a logic 0 level is stored into all bit locations). When the clear signal CLR is brought to a logic 0 level, the functions of the 10-bit counters 36, $26_1$–$26_N$ and $27_1$–$27_N$ are not affected.

A load signal LOAD loads a preset value into the presettable 10-bit counter 36. When the load signal LOAD is brought to a logic 1 level, the presettable 10-bit counter 36 is loaded with the value of OFOH. When the load signal LOAD of the 5 bit register 32 is brought to a logic 0 level, the presettable 10-bit counter 36 is not affected and counting can begin.

The data select signal DS places the shift registers 21 and $22_1$–$22_N$ in either the random access mode or the shift register mode. When the data select signal DS of the 5-bit register 32 is at a logic 0 level, the shift registers 21 and $22_1$–$22_N$ operate in the random access mode. The logic 0 level of the data select signal DS is inverted by inverter 44, supplied to the data input D of D flip/flop $42_i$ through the data select OR gate $46_i$. Thus, each D flip/flop $42_i$ in every memory cell in every shift register 21 and $22_1$–$22_N$ has a data input D set to a value of logic 1.

Referring to FIGS. 4 and 5, 5 to 32 bit X-digraph decoder 40 decodes address bits A0–A4, 5 to 32 bit Y-digraph decoder 41 decodes address bits A5–A9, and 7 to 128 bit decoder 30 decodes address bits A10–A16. The 5 to 32 bit X-digraph decoder 40, 5 to 32 bit Y-digraph decoder 41, and the 7 to 128 bit decoder 30 respectively output a plurality of decoded signals $X_O$–$X_m$, $Y_O$–$Y_m$, and $Ce_O$–$CE_{127}$. A different combination of these decoded signals $X_O$–$X_m$, $Y_O$–$Y_m$, and $Ce_O$–$Ce_{127}$ are input into each memory cell select AND gate 43 so that a logic 1 may be selectively written into each memory cell within the shift registers 21 and $22_1$–$22_N$.

In the random access mode, a logic 1 may be written into any selected memory cell by applying an appropriate address on address signals A0–A16 while simultaneously actuating the write enable We from the 5-bit register 32 signal. For example, to store a logic 1 into memory cell location 1000 of the unknown word shift register 21, the central processing unit 2 would output a write enable signal We in conjunction with an address having a value of 00000H. To store a logic 1 into memory cell location 1001 of the unknown word shift register 21, the central processing unit 2 would output an address having a value of 00001H in conjunction with a write enable signal We. To store a logic 1 into the first memory cell location of the first known word shift register $22_1$, the central processing unit 2 would output an address having a value of 00400H in conjunction with a write enable signal We.

When operated in the random access mode, each shift register 21, $22_1$–$22_N$ may be viewed as a two-dimensional array with address signals A0–A4 accessing address bits within a column (X0–27 column addresses), and address signals A5–A9 accessing an individual row of address bits (Y0–Y27 row address). In this mode, each bit within each shift register 21 and $22_1$–$22_N$ is randomly writable by applying an appropriate address and control signals from the system bus 5.

In a preferred mode of operation, it may be desirable to utilize address signals A0–A4 as a first letter bus and address signals A5–A9 as a second letter bus. In the general case, each letter bus would have K lines. In the preferred embodiment, each letter bus has 5 lines that are used to encode a single ASCII symbol such as a particular letter. The hex codes for the ASCII symbols @ through [ range from 20 H through 3C H. It is apparent to those skilled in the art that only the five lower order bits of the ASCII code are required to uniquely identify the subset of ASCII symbols falling within the range of 20–3C H. Thus, it is desirable to identify these ASCII codes with an input to the digraph decoders ranging from 0 through 3C H.

In the random access mode, the 5 to 32 bit X-digraph decoder 40 and the 5 to 32 bit Y-digraph decoder 41 are standard demultiplexers with only the first 28 output bits utilized. In the general case, the decoders 30, 40, 41 may have any number of inputs and corresponding outputs. Truth tables for the operation of the 5 to 32 bit X-digraph decoders 40 and the Y-digraph decoder 41 are respectively shown in Tables 1 and 2.

TABLE 1

5 to 32 Bit X-digraph Decoder Truth Table

| | INPUT | | | | | |
|---|---|---|---|---|---|---|
| | A0 | A1 | A2 | A3 | A4 | |
| OUTPUT | | | | | | |
| @ - X0 | 0 | 0 | 0 | 0 | 0 | @ = 1 (all others 0) |
| A - X1 | 0 | 0 | 0 | 0 | 1 | A = 1 (all others 0) |
| B - X2 | 0 | 0 | 0 | 1 | 0 | B = 1 (all others 0) |
| . | | | | | | |
| . | | | | | | |
| Y - X25 | 1 | 1 | 0 | 0 | 1 | Y = 1 (all others 0) |
| Z - X26 | 1 | 1 | 0 | 1 | 0 | Z = 1 (all others 0) |
| [ - X27 | 1 | 1 | 0 | 1 | 1 | [ = 1 (all others 0) |

TABLE 2

| | INPUT | | | | | |
|---|---|---|---|---|---|---|
| | A5 | A6 | A7 | A8 | A9 | |
| OUTPUT | | | | | | |
| @ - Y0 | 0 | 0 | 0 | 0 | 0 | @ = 1 (all others 0) |
| A - Y1 | 0 | 0 | 0 | 0 | 1 | A = 1 (all others 0) |
| B - Y2 | 0 | 0 | 0 | 1 | 0 | B = 1 (all others 0) |
| . | | | | | | |
| . | | | | | | |
| Y - Y25 | 1 | 1 | 0 | 0 | 1 | Y = 1 (all others 0) |
| Z - Y26 | 1 | 1 | 0 | 1 | 0 | Z = 1 (all others 0) |
| [ - Y27 | 1 | 1 | 0 | 1 | 1 | [ = 1 (all others 0) |

In a preferred embodiment, digraphs are formed from the known word and each of the unknown words. The digraphs are stored in the shift registers 21 and $22_1$–$22_N$. Each digraph is formed from the 26 letters of the English language alphabet plus a word-start marker @ and a word-end marker [. The 5 to 32 bit demultiplexers 40 and 41 have 28 output lines respectively labeled X0–X27 and Y0–Y27 to correspond to ASCII @ through [.

In a preferred method, a digraph corresponding to a particular unknown word is formed in the unknown word shift register 21 as follows. The unknown word shift register is cleared using the zero 1 signal ZERO1 from the 5 bit register 32 as discussed above. The data select signal DS is set to a logic 0 so that the shift registers 21 and $22_1$–$22_N$ are operated in the random access mode. The central processing unit 2 reads the first unknown word from a memory location or the I/O device 4.

The central processing unit 2 sets address signal lines A0–A4 equal to the lower order 5 bits in the ASCII @ character signifying the start of a word, address signals A5–A9 equal to the lower order 5 bits of the first letter of the current unknown word, and address signals A10–A16 equal to the address of the unknown word shift register 21 (i.e., 00H). The central processing unit then outputs a write enable signal We to write a logic 1 into the selected memory cell location in the unknown word shift register 21.

Next, the central processing unit 2 sets address signal lines A0–A4 equal to the value of the address signals A5–A9 used in the previous comparison. Address signals A5–A9 are then set equal to the lower order 5 bits of the next letter of the current unknown word. Address signals A10–A16 remain equal to the address of the unknown word shift register 21 (i.e., 00H). The central processing unit then outputs a write enable signal We to write a logic 1 into the selected memory cell location in the unknown word shift register 21. This process is repeated until address signals A5–A9 are set equal to the end of word ASCII symbol [.

In a preferred embodiment, a digraph corresponding to a particular known word is formed in a similar manner as described above for the unknown word. When writing a new dictionary containing a plurality of known words, each of the known word shift registers $22_1$–$22_N$ is cleared using the zero 2 signal ZERO2 from the 5 bit register 32 as discussed above. The data select signal DS is set to a logic 0 so that the shift registers 21 and $21_1$–$22_N$ are operated in the random access mode. The central processing unit 2 reads the first known word from a memory location or the I/O device 4. The known words are preferably only loaded once, upon start-up or when changing dictionaries.

The central processing unit 2 then sets address signal lines A0–A4 equal to the .Lower order 5 bits in the ASCII @ character signifying the start of a word, address signals A5–A9 equal to the lower order 5 bits of the first letter of the current known word, and address signals A10–A16 equal to one of the addresses of the known word shift registers $22_1$–$22_N$ (i.e., 01H through 7EH). The central processing unit then outputs a write enable signal We to write a logic 1 into the selected memory cell location in the known word shift register $22_1$–$22_N$.

The central processing unit 2 then sets address signal lines A0–A4 equal to the value of the address signals A5–A9 used in the previous comparison. Address signals A5–A9 are then set equal to the lower order 5 bits of the next letter of the current known word. Address signals A10–A16 remain equal to the address of the selected known word shift register $22_i$. The central processing unit then outputs a write enable signal We to write a logic 1 into the selected memory cell location in the known word shift register $22_i$. This process is repeated until address signals A5–A9 are set equal to the end of word ASCII symbol [.

The above described process is repeated until a digraph corresponding to a known word is stored in each of the known word shift registers $22_1$–$22_N$. Once all of the shift registers 21 and $22_1$–$22_N$ have been loaded with an appropriate digraph, the word identifier logic may be placed in a shift register mode. The shift register mode is preferably used to compare the unknown word digraph loaded into the unknown word register 21 with each of the known word digraphs loaded into the known word registers $22_1$–$22_N$. The comparison may be performed in a bit serial manner by shifting the contents of each of the shift registers 21 and $22_1$–$22_N$ a complete rotation until all of the bits have been output through the shift register data output OUT.

Prior to initiating the shift register mode, the 10-bit hit counters $26_1$–$26_N$, the 10-bit miss counters $27_1$–$27_N$ and the 10-bit counter 36 are cleared, and the presettable 10-bit counter 36 is preset to 040H. The shift register mode is initiated by bringing the data select signal DS to a logic 1 level. With reference to FIG. 5, the data select signal DS is inverted by the inverters $44_1$–$44_N$ so that a logic 0 is input into the first input of data select OR gates $46_1$–$46_N$. In this configuration, each D flip/flop $42_2$–$42_N$ receives, at its data input D, a value equal to the output of the preceding D flip/flop $42_1$–$42_{N-1}$. As previously discussed, the output from the last D flip/flop is coupled to the input of the first D flip/flop completing the circular configuration.

When the data select signal DS is changed to a logic 1 value, the controlled clock signal CCLK is enabled by the clock enable AND gate 34. The controlled clock signal CCLK is inverted by clock inverter 35 and input into a plurality of clock AND gates $33_{1A}$–$33_{NA}$ and $33_{1B}$–$33_{NB}$.

The current shift register data bit appearing at the output OUT of the unknown word shift register 21 is input to the first input of the plurality of hit AND gates $23_1$–$23_N$ and input into the first input of the miss XOR gates $24_1$–$24_N$. The current shift register data bits appearing at the output OUT of each of the known word shift registers $22_1$–$22_N$ are respectively input into the second input of the plurality of hit AND gates $23_1$–$23_N$ and input into the second input of the plurality of miss XOR gates $24_1$–$24_N$. The hit AND gates $23_1$–$23_N$ have an output equal to a logic 1 whenever both the connected shift registers input a logic 1 into a respective hit AND gate $23_i$. The occurrence of a logic 1 at the output of a hit AND gate $23_i$ indicates that a hit, i.e. match, has occurred. The corresponding clock AND gate $33_{iA}$ cooperates with the inverted clock control signal CCLK and the output from the hit AND gate $23_i$ to increment the respective 10-bit hit counter on a falling edge of the controlled clock signal CCLK each time that a hit occurs.

The miss XOR gates $24_1$–$24_N$ have an output equal to a logic 1 whenever identical bit address location currently being received at the input of a particular miss XOR gate 24, have opposite logic levels (i.e., logic "1" and logic "0"). The occurrence of a logic 1 at the output of a miss XOR gate $24_i$ indicates that a miss has occurred. The plurality of clock AND gates $33_{2A}$–$33_{2N}$ cooperate with the inverted clock control signal CCLK and the output from the miss XOR gates 15 to increment a respective 10-bit miss counters $27_i$ on the falling edge of the controlled clock signal CCLK each time that a miss occurs.

In FIG. 5 the control clock signal CCLK is coupled to the clock input CLK of each of the D flip/flops $42_1$–$42_N$ through a respective clock select OR gate $45_1$–$45_N$. The rising edge of the control clock signal CCLK shifts a new data bit value into the memory cell location output from the data out OUT signal from each of the shift registers 21 and $22_1$–$22_N$. The rising edge of the control clock signal CCLK also increments the presettable 10-bit counter 36. The falling edge of the control clock signal CCLK increments each of the 10-bit hit counters $26_1$–$26_N$ provided a hit is indicated by the corresponding hit AND gate and increments each of the plurality of 10-bit miss counters $27_1$–$27_N$ provided a miss is indicated by the corresponding miss XOR gate. When the presettable 10-bit counter 36 has been incremented 784 times, the carry output signal CARRY will be activated. The number of times the presettable 10-bit counter 36 increments before the carry output signal CARRY is activated is determined by the value loaded by the load signal LOAD. Activation of the carry output activates the interrupt signal INTERRUPT. The INTERRUPT signal informs the central processing unit 2 via the system bus 5 that all bits within the shift registers 21 and $22_1$–$22_N$ have been compared. The interrupt signal INTERRUPT is also input into the clock enable AND gate 34 and disables the controlled clock, preventing any further shifting of the shift registers 21 and $22_1$–$22_N$ or incrementing of the 10-bit counters 36, $26_1$–$26_N$, and $27_1$–$27_N$.

In the above manner, the bit pattern corresponding to an unknown word is shifted out from the unknown word shift register 21 in a serial bit format. Similarly, bit patterns corresponding to a plurality of known words are simultaneously shifted out from the known word shift registers $22_1$–$22_N$ in a serial bit format. A particular 10-bit hit counter $26_i$ is incremented each time the shift registers 21 and $22_1$–$22_N$ are shifted and a logic 1 is output from one of the hit AND gates $23_i$. A particular 10-bit miss counter $27_i$ is incremented each time the shift registers 21 and $22_1$–$22_N$ are shifted and a logic 1 is output from a corresponding XOR gate $24_i$. When all 784 bits have been shifted out from the shift registers 21 and $22_1$–$22_N$, the 10-bit hit counters $26_1$–$26_N$ and 10-bit miss counters $27_1$–$27_N$ respectively contain the number of hits and misses that have occurred in the comparison of each known word with the unknown word.

The contents of each of the respective 10-bit hit counters $26_1$–$26_N$ and 10-bit miss counters $27_1$–$27_N$ are individually accessible by the central processing unit 2 by outputting an appropriate address on address signals A10–A16 in conjunction with the read enable Rd signal. For example, to obtain the results of the comparison between the unknown word and the first known word stored in known word 1 shift register, the central processing unit would output a logic 00H on address signals A10–A16 in conjunction with a read signal. In response, the first 10-bit miss counter $26_1$ outputs a 10 bit counter value onto data signal lines D0–D9, and the first 10-miss counter $27_1$ outputs a 10-bit counter value onto data signal lines D16–D25. The central processing unit 2 then increments the address output on address signals A10–A16 until all 10-bit hit counters $26_1$ and all 10-bit miss counters $27_1$ have been read. After all the 10-bit hit and miss counters $26_1$–$26_N$ and $27_1$–$27_N$ have been read, the central processing unit 2 may clear all 10-bit counters 36, $26_1$–$26_N$ and $27_1$–$27_N$ by activating the clear signal CLR.

I claim:

1. An apparatus for comparing an unknown word to a plurality of known, dictionary words to identify the unknown word comprising:
   a first memory area storing data corresponding to an unknown word;
   a plurality of second memory areas, each second memory area respectively storing data corresponding to one of a plurality of known, dictionary words;
   control means coupled to the first memory area and the second memory areas including an unknown word decoder for decoding each of the unknown words and for forming unknown word digraphs respectively representing the plurality of unknown words, the control means storing the unknown word digraphs in the first memory area and including a dictionary word decoder for decoding each of the plurality of dictionary words for each of the known, dictionary words and for forming a plurality of dictionary word digraphs from the known, dictionary words respectively representing the known, dictionary words, and the control means respectively storing each of the plurality of dictionary word digraphs in the plurality of second memory areas;
   an arithmetic logic unit coupled to the first memory area and the second memory areas for comparing the unknown word digraphs to the dictionary word digraphs and generating an output signal indicating a hit when an unknown word digraph corresponds to at least one of the dictionary word digraphs; and
   a hit counter for counting and indicating the number of hits.

2. The apparatus of claim 1 wherein the arithmetic logic unit generates an output signal indicating a miss when an unknown word does not correspond to at least one of the dictionary words and including a miss counter for counting and indicating the number of misses.

3. The apparatus of claim 2 wherein the arithmetic logic unit includes an AND gate for determining a hit count for each of the known, dictionary words and the miss counter includes an XOR gate for determining the miss count for each of the known, dictionary words.

4. The apparatus of claim 3 wherein the arithmetic logic unit includes a plurality of AND gates and a plurality of XOR gates operating in parallel for simultaneously determining the hit and miss count for each of the known, dictionary words.

5. The apparatus of claim 1 wherein the first memory area and each of the plurality of second memory areas include circular shift registers.

6. The apparatus of claim 2 wherein the control means includes means for determining a confidence factor associated with each known, dictionary word equal to:

$$1 - \left( \frac{\text{MISSES}}{\text{HITS}} \right) = \text{FACTOR.} \tag{1}$$

7. An apparatus for comparing an unknown word to a plurality of known dictionary words to identify the known word comprising:
   a plurality of known word circular shift registers respectively storing one of a plurality of known word digraphs, each known word corresponding to one of a plurality of known, dictionary words;
   an unknown word circular shift register storing data corresponding to an unknown word; and
   control means for decoding each of the unknown words to form an unknown word digraph, for storing the unknown word digraph in the unknown word circular shift register, and for simultaneously shifting the unknown word circular shift register and each of the plurality of known word circular shift registers to compare the unknown word digraph to the known word digraphs.

8. The apparatus of claim 7 comprising:

an arithmetic logic unit including a plurality of logic AND gates coupled to the unknown word circular shift register and the known word circular shift registers for simultaneously comparing a plurality of bits respectively output from the plurality of known word circular shift registers with a bit output from the unknown word circular shift register and generating an output signal indicating a hit when bits for each known word circular shift register correspond to bits in the unknown word circular shift register; and a counter for counting and indicating the number of hits.

9. The correlating apparatus of claim 8 wherein the arithmetic logic unit includes a plurality of logic XOR gates coupled to the unknown word circular shift register and respectively coupled to the plurality of known word circular shift registers for determining a miss count for each known word digraph of the plurality of unknown word digraphs by simultaneously comparing a plurality of bits respectively output from the plurality of unknown word circular shift registers with a bit output from the unknown word circular shift register using the plurality of logic XOR gates, the miss count for each known word digraph indicating the number of bits, for each known word circular shift register, which do not correspond to bits in the unknown word circular shift register.

* * * * *